US009201087B2

(12) United States Patent
Della Vedova

(10) Patent No.: US 9,201,087 B2
(45) Date of Patent: Dec. 1, 2015

(54) DEVICE FOR MEASURING THE SPEED OF PRODUCTS IN MOVEMENT, IN PARTICULAR METAL ROLLED PRODUCTS IN A ROLLING LINE, AND RELATIVE METHOD

(75) Inventor: Ferruccio Della Vedova, Pozzuolo Del Friuli (IT)

(73) Assignee: DANIELI AUTOMATION SPA, Buttrio (IT)

( * ) Notice: Subject to any disclaimer, the term of this patent is extended or adjusted under 35 U.S.C. 154(b) by 640 days.

(21) Appl. No.: 13/576,136

(22) PCT Filed: Feb. 1, 2011

(86) PCT No.: PCT/IB2011/000163
§ 371 (c)(1),
(2), (4) Date: Jul. 30, 2012

(87) PCT Pub. No.: WO2011/095870
PCT Pub. Date: Aug. 11, 2011

(65) Prior Publication Data
US 2012/0303315 A1    Nov. 29, 2012

(30) Foreign Application Priority Data
Feb. 2, 2010    (IT) .............................. UD2010A0017

(51) Int. Cl.
*G01P 3/36* (2006.01)
*G06F 15/00* (2006.01)
(Continued)

(52) U.S. Cl.
CPC . *G01P 3/68* (2013.01); *G01P 1/026* (2013.01); *G01P 3/806* (2013.01)

(58) Field of Classification Search
CPC ........... G01P 3/806; G01P 1/026; G01P 3/68; B22D 11/185; B22D 11/204
USPC ................... 702/49, 75, 76, 96, 97, 142, 149; 382/106, 278; 356/28
See application file for complete search history.

(56) References Cited

U.S. PATENT DOCUMENTS 3,824,015 A    7/1974    Petit et al.
4,912,519 A    3/1990    Yoshida et al.
(Continued)

FOREIGN PATENT DOCUMENTS

DE    4225842 A1    2/1994
EP    0065906 A1    12/1982
EP    0582112 A1    2/1994

OTHER PUBLICATIONS

International Search Report, Jul. 11, 2011, for PCT application No. PCT/IB2011/000163 to Della Vedova filed Feb. 1, 2011.
(Continued)

*Primary Examiner* — John H Le
(74) *Attorney, Agent, or Firm* — Novak Druce Connolly Bove + Quigg LLP

(57) ABSTRACT

Device for measuring speed of oblong products moving along feed direction and emitting radiations, in particular rolled metal products in rolling line, including two radiation sensors, disposed reciprocally at close distance respectively defining an optical observation window, at pre-arranged distance from each other. Each window covers the image of an advancing product determinate portion equal to relative window width, irrespective of portion's movements transverse to feed direction. Sensors observe the presented product portion, on each occasion, in correspondence with associated windows consecutively along feed direction, and measure continuously intensity of radiation from the product portion in correspondence with the windows. Electronic processing unit determines, by processing electric signals associated with detected radiation intensity and arriving from sensors, using algorithms based on the correlation principle, time taken by the product portion to transit from first window to second, successive window, and then, based on distance between windows, calculates product speed.

20 Claims, 7 Drawing Sheets

(51) Int. Cl.
*G01P 3/68* (2006.01)
*G01P 1/02* (2006.01)
*G01P 3/80* (2006.01)

(56) References Cited

U.S. PATENT DOCUMENTS 8,548,268 B2 * 10/2013 Della Vedova et al. ....... 382/278

2001/0046042 A1   11/2001 Theile et al.

OTHER PUBLICATIONS

Written Opinion, Jul. 11, 2011, for PCT application No. PCT/IB2011/000163 to Della Vedova filed Feb. 1, 2011.

* cited by examiner

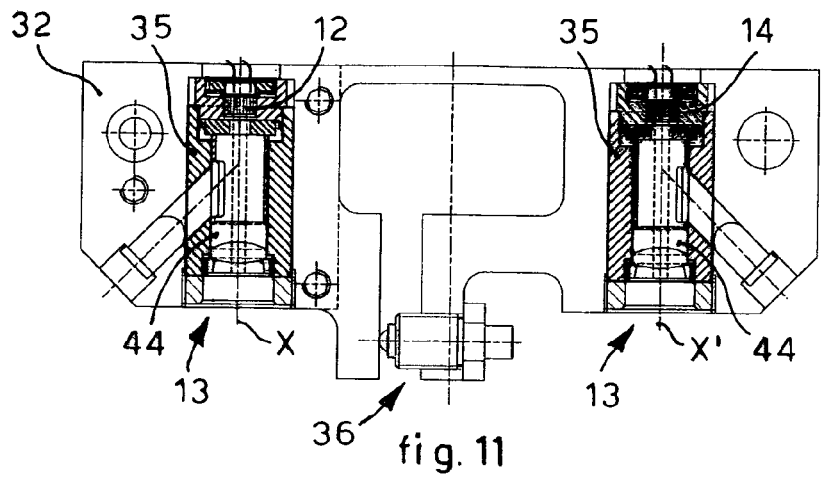
fig. 11
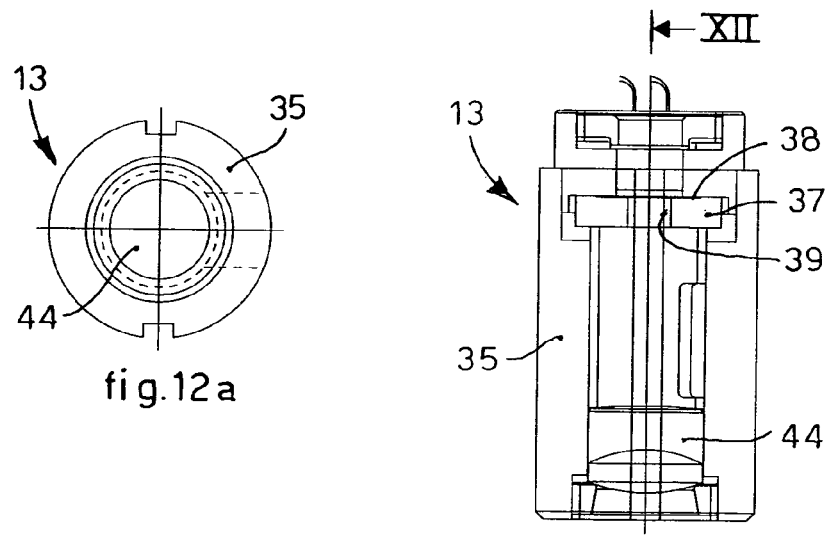
fig. 12a
fig. 12b
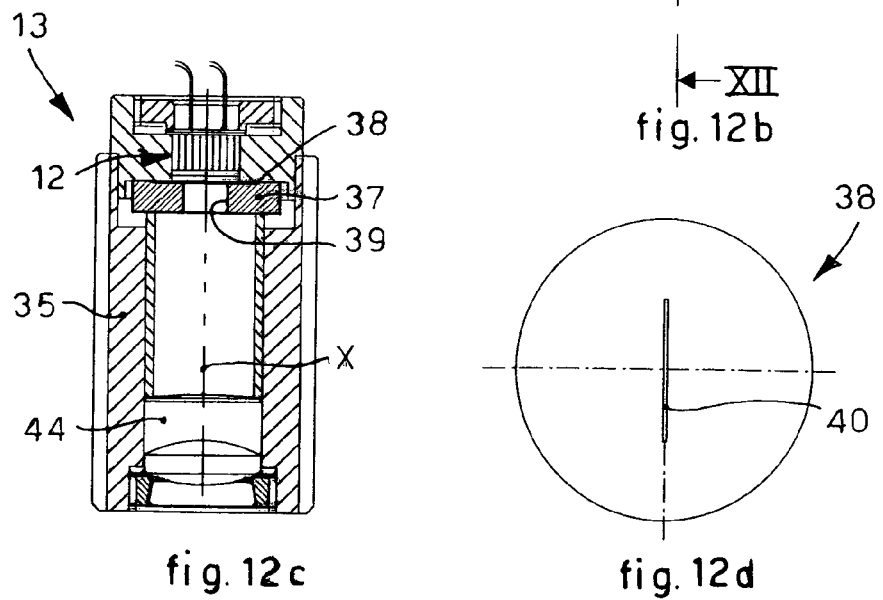
fig. 12c
fig. 12d

DEVICE FOR MEASURING THE SPEED OF PRODUCTS IN MOVEMENT, IN PARTICULAR METAL ROLLED PRODUCTS IN A ROLLING LINE, AND RELATIVE METHOD

CROSS-REFERENCE TO RELATED APPLICATIONS

This application is a §371 National Stage Application of International Application No. PCT/IB2011/000163, filed on 1 Feb. 2011, claiming the priority of Italian Patent Application No. UD2010000017 filed on 2 Feb. 2010, each incorporated herein by reference.

FIELD OF THE INVENTION

The present invention concerns a device and the relative method for measuring the speed of oblong products in movement, in particular although not exclusively for measuring the speed of rolled metal products, flat or long, in a rolling line, for example in an interstand segment or at exit from a finishing train.

BACKGROUND OF THE INVENTION

Within a rolling process for flat or long products, the need to measure the speed of the product at exit from a rolling stand is known.

Various solutions have been proposed for this purpose, but these have often proved, for various reasons, unsuitable and/or not completely effective.

In particular, methods involving contact are known, for example based on measuring rolls, which are unadvisable given the high temperatures of the rolled metal products in the rolling line, giving rise to problems of slipping, cooling and wear which lead to a reduction in the accuracy of the measurements.

Doppler effect laser measurers are also known, and therefore without contact, but these are costly and complex and, for low or negative speeds, need expensive acoustic-optical modulators.

Moreover, these laser measurers are not suitable for applications dedicated to small section rolled products, which are subject to vibrations or oscillations transverse to the direction of feed, with displacements with respect to the direction of feed of an entity comparable to or greater than the section size of the rolled product itself.

Indeed, in such cases, the use of laser, which produces a substantially dot-like beam of coherent light which hits the rolled product, does not guarantee, in the event of oscillations as above, that the measuring device is constantly trained, which leads to inaccuracies or failure in the measurement of speed.

Furthermore, in the case of small diameter round rolled products of the ribbed type, suitable for structural applications in making reinforced concrete structures, neither the solution with the contact measuring roll nor the Doppler effect laser measurer provide acceptable results, because of the particular structure of the surface of the rolled product.

Document U.S. Pat. No. 3,824,015 describes a method and the relative apparatus for the optical measurement of a moving product, such as a rolled metal product, which provides to use two means to detect a ray of light coming from the product and mounted distanced on a support structure, which detect light signals in a temporally delayed manner one from the others, so as to form an image of the surface of the element of the product on each detection mean, and to generate a corresponding correlation function according to which the value of speed of the product can be calculated.

Document U.S. Pat. No. 4,912,519 describes an apparatus for measuring speed comprising a semiconductor laser to irradiate light on a moving object and two photo-sensor devices, disposed in the direction of movement of the objects at a predetermined distance from each other and temporally delayed one with respect to the other so as to calculate the speed or the distance traveled in time by the object.

Document US-A-2001/0046042 describes a device for measuring the speed of an object that comprises two sensors disposed distanced along the direction of movement of the object, and which transmit the relative signals to a delay correlation device which digitalizes the signals, calculates the time stagger of the signals and carries out a phase comparison of the digitalized instantaneous values from which the speed is found.

Document DE-A-4225842 describes a device for measuring the speed of fabrics which comprises two optical or capacitive sensors distanced from each other and a time correlation device.

Document EP-A-0.065.906 describes a correlation device and method to determine the speed of a moving product.

One purpose of the present invention is to achieve a device for measuring the speed of moving products, in particular but not only rolled metal products in a rolling line, and to perfect a relative measuring method, which is without contact, economical, reliable and accurate.

Another purpose of the invention is to achieve a speed measuring device, and to perfect a relative method, suitable for contexts where there are rolled products, also with a limited section, subject to vibrations or oscillations transverse to the direction of feed, also big vibrations or oscillations, in any case maintaining high measurement precision and reliability.

A further purpose of the present invention is to achieve a speed measuring device and to perfect a relative method, suitable to measure the speed of bars or other rolled products, of the ribbed type.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, and according to a first aspect of the present invention, a device for measuring the speed of oblong products moving in a determinate direction of feed and emitting radiations, for example of the visible type, infrared, in particular rolled metal products in a rolling line, comprises:

at least two radiation sensors, suitable to detect the overall energy irradiated by the moving oblong product, disposed reciprocally at a close distance and each able to define a respective optical observation window, which are disposed at a known distance from each other, each window being configured so as to always cover the image of a determinate portion of advancing product equal to the width of the relative window, irrespective of the possible movements made by the portion of advancing product transversely to the direction of feed, wherein each of the windows has an oblong rectangular shape, with the bigger side, or length, transverse to, and width parallel to, the direction of feed of the product to be measured, wherein the ratio between length and width of each window is comprised between 3:1 and 20:1, preferably between 5:1 and 15:1, the sensors being able to observe the portion of product which is presented, on each occasion, in correspondence with the associated optical windows consecutively along the direction of feed, the sensors also being able to measure continuously the intensity of the radiation emitted by the portion of the product in correspondence with the optical windows;

an electronic processing unit able to determine, by processing electric signals associated with the intensity of radiation detected and arriving from the two sensors, using mathematical algorithms based on the correlation principle, the time taken by the portion of product to transit from a first optical window to a second, successive optical window, and then, on the basis of the known distance between the two optical windows, to calculate the speed of the product. In some forms of embodiment of the present invention, the sensors are optical sensors, for example of the type sensitive to the radiations determined by the overall energy irradiated by the moving product, including radiations of the visible and infrared. Consequently, the sensors are not configured to form visible images of the moving product, but to detect all the energy irradiated by the moving product which comes within the optical windows as defined above.

By making long and narrow optical windows as described above and disposed transverse, advantageously perpendicular, to the direction of feed of the product, it is possible to identify a greater harmonic content, and hence higher frequencies, of the signals detected of total energy irradiated, and to effect a finer analysis of the movement in the direction of feed of the product; it is thus possible to suppress the negative influence on the measurement of the speed of the vertical variations and oscillations of the moving product, at the same time emphasizing, in the direction of feed, the local differences on the portions of the surface of the moving product.

Advantageously, in some forms of embodiment, the measuring device also comprises an optical unit or system associated or in cooperation with each of the sensors sensitive to radiations, which is able to focus the radiation emitted by the portion of the product in transit along the associated optical window onto the relative sensor. Each of the optical units has optical axes that are parallel to each other. This has the advantageous technical effect of making the distance between the portions of product on each occasion observed by the optical windows substantially independent of the distance between the measuring device and the advancing product, obviating the problems of displacement of the moving product, in particular along the depth with respect to the measuring device.

According to another aspect of the present invention, a method for measuring the speed of oblong products moving along a determinate direction of feed and emitting radiations, for example of the infrared type, in particular rolled metal products in a rolling line, provides:

to define at least two optical observation windows, disposed at a known distance from each other, which are configured so as to always cover the image of a determinate portion of advancing product of a size equal to the width of the optical window, irrespective of the possible movements made by said portion transversely to the direction of feed;

to observe the determinate portion of product which is presented, on each occasion, in correspondence with the associated optical windows, consecutively along the direction of feed;

to measure continuously the intensity of the radiation emitted by the portion of product in correspondence with the optical windows;

to process the electric signals associated with the radiation detected, using mathematical algorithms based on the correlation principle, to determine the time taken by the portion of product to transit from a first optical window to a second, successive optical window, and then, on the basis of the known distance between the two optical windows, to calculate the speed of the advancing product.

By providing optical windows configured as described above, which determine mating observation zones on the moving product, and the advantageous solution with parallel optical axes, the measurement made with the present invention is rendered independent, that is, not influenced by displacements, vibrations or oscillations transverse to the direction of feed, in particular both along the height and along the depth.

Indeed, the product in transit, especially a rolled metal product, even if it vibrates, for example along the height or the depth, always remains substantially parallel to itself in the measuring range, due to the high speed of feed.

Consequently, even when displaced transversely with respect to the direction of feed, the product always emits the same quantity of radiations which will be detected by the sensors of the measuring device, and therefore the measurement of the speed will be reliable and precise even in the case of products, for example rolled products, with a limited section and subject to the vibrations described above.

According to a preferential form of embodiment of the invention, each of the optical windows develops transversely to the direction of feed of the product to be measured, for example it develops with its main direction of extension substantially orthogonal to the direction of feed of the product. In some forms of embodiment, each window in particular has an oblong shape.

In even more preferential forms of embodiment of the invention, each optical window has a rectangular shape, advantageously elongated, with length transverse to the direction of feed and width parallel to the direction of feed of the product to be measured. Consequently, even the respective observation zone on the moving product has a rectangular shape and, in general, has the shape of the optical window.

According to some forms of embodiment of the invention, the ratio between length and width of each optical window is comprised between 3:1 and 20:1, preferably between 5:1 and 15:1. A preferential form of embodiment provides a ratio of 13:1.

Advantageously, each rectangular window has its bigger side, or length, oriented in a direction orthogonal to the direction of feed of the moving product and of a size much bigger than the transverse size of the product, so as to render the signal acquired through the optical windows substantially independent of any transverse movements of the product, due to transverse vibrations thereof. In some forms of embodiment, the ratio between the length of each optical window and the transverse size of the moving oblong product is comprised between 12:1 and 3:1, preferably between 10:1 and 6:1.

A specific example of a form of embodiment of the present invention provides a length of 40 mm and a width of 3 mm for the optical window, coordinated with a transverse size of the moving product of 5 mm.

In some advantageous forms of embodiment, the present invention exploits the fact that the products in question, in particular rolled metal products arriving from hot rolling, emit infrared radiations. In some forms of embodiment, the operating temperature of the rolled metal product of which the speed is to be measured by the device according to the present invention is comprised between about 700° C. and about 1250° C.

Furthermore, in some preferential forms of embodiment, the present invention uses the irregularities or dis-uniformities normally present on the surface of the rolled metal product as a univocal reference to evaluate, by means of the mathematical algorithms based on the correlation principle, the delay between the signals detected in consecutive optical windows and to thus determine the speed of advance of the product.

Consequently, the more irregularities there are, the greater the reliability of the measurement according to the invention, although, for the correct functioning of the invention, the surface irregularity typical of a hot smooth rolled product on emission is sufficient.

According to the present invention, every sensor detects the emission of radiations of a portion of the moving product through the optical windows, for example a thin rectangular area, in the respective observation zone. The surface irregularities present on the moving material cause variations in the light emission detected by the sensors.

According to the invention, since the two sensors observe the same portion of the product in two consecutive zones, the emission of radiations detected by the second sensor has a development similar to the development of the emission detected by the first sensor, after a delay time that depends on the speed of feed of the rolled metal product.

According to the invention, knowing the distance between the optical windows and the relative observation zones of the two sensors, by means of the mathematical algorithms based on the correlation principle, it is possible to calculate said delay precisely and consequently the speed of the moving product.

The present invention can advantageously be used every time it is desired to know with precision the speed of feed of a product that emits or diffuses radiations, advantageously infrared, and therefore not necessarily a hot rolled metal product.

In advantageous forms of embodiment of the invention, the measurement of the speed is carried out in both directions of feed, even if it is not possible to detect changes in direction since a minimum speed of movement is necessary.

The invention has been developed preferentially for use in hot rolling plants for steel, however, it may also be used in similar applications.

A further advantage of the invention is that it allows to measure the rolled metal product without contact, thus overcoming the problems of the state of the art.

In some forms of embodiment, the device also comprises a coherent light emitter, such as a laser beam, which projects a thin line of light in correspondence with the ideal position in which the axis of sliding of the product whose speed is to be measured must be. In some difficult situations, this serves to facilitate the correct training of the sensors on the product, which guarantees a highly reliable detection.

In some forms of embodiment, the device according to the present invention comprises a strong container, made of aluminum or other suitable material, metal or non-metal, in which the radiation sensors can be housed, which is supported by a support which allows to attach it and facilitates orientation on both the horizontal and vertical planes.

In some forms of embodiment, the container is provided with an incorporated circuit for fluid cooling. Depending on the environmental working conditions, the circuit can be fed with water or other cooling fluids.

In some forms of embodiment, the container provides one or more apertures, typically on the front side, through which the two internal sensors which define the optical windows can observe the moving product.

Other advantages of the invention are the high precision, with deviations of less than 0.2%, simple use, limited sizes, robust construction, suitable for installation in difficult industrial environments.

The invention advantageously also allows to measure the speed of products moving at high speed: as a matter of fact, the range of speeds that can be measured goes from about 0.5 m/s to more than 100 m/s.

In some forms of embodiment, the device comprises internally a heating module or element, advantageously equipped with a control thermostat, which is activated if the internal temperature goes below a given minimum threshold, for example 10° C. The heating element has the advantageous technical effect of containing the thermal expansion of the components that support the sensors and the associated optical units, making the measurement of speed substantially independent of the temperature of the device.

In some forms of embodiment, the measuring device is installed at the side or above the rolling line, preferably at the side provided that it is guaranteed that the moving rolled metal product, in all conditions, comes within the reading range of the device, whereas, preferentially, orientation from below is avoided because dust and scale could dirty the optical window, impeding the correct functioning thereof.

In some forms of embodiment, especially in the case of an installation in a difficult environment, it is convenient to equip the measuring device with an additional mechanical and/or thermal protection against accidental knocks and irradiance, for example by using a metal sheet screen, holed in correspondence with the optical window, which also protects it from the hot air arriving from the hot product, in particular in the case of a hot rolled product.

BRIEF DESCRIPTION OF THE DRAWINGS

These and other characteristics of the present invention will become apparent from the following description of a preferential form of embodiment, given as a non-restrictive example with reference to the attached drawings wherein:

FIG. 11 is a section from XI to XI of FIG. 8;

FIG. 12a is a front view of an optical unit of the device according to the present invention;

FIG. 12b is a plane view from above of the optical unit in FIG. 12a;

FIG. 12c is a section from XII to XII of FIG. 12b;

FIG. 12d is an enlarged detail of a part of the optical unit in FIG. 12a;

Figure 1:
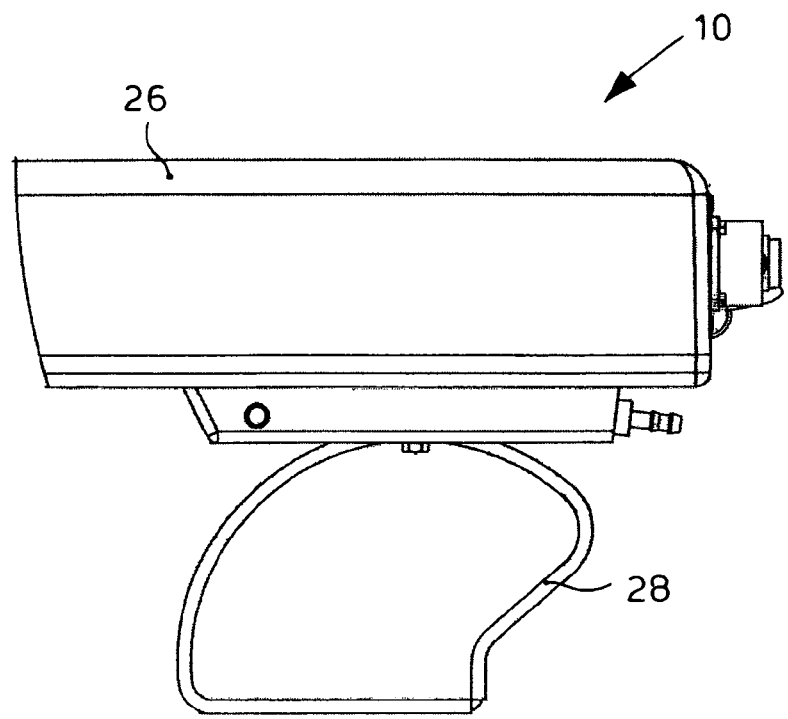
FIG. 1 is a lateral view of a measuring device according to the present invention.

To facilitate comprehension, the same reference numbers have been used, where possible, to identify common elements in the drawings that are substantially identical. It is understood that elements and characteristics of one form of embodiment can conveniently be incorporated into other forms of embodiment without further clarifications.

DETAILED DESCRIPTION OF A PREFERENTIAL FORM OF EMBODIMENT

Figure 2:
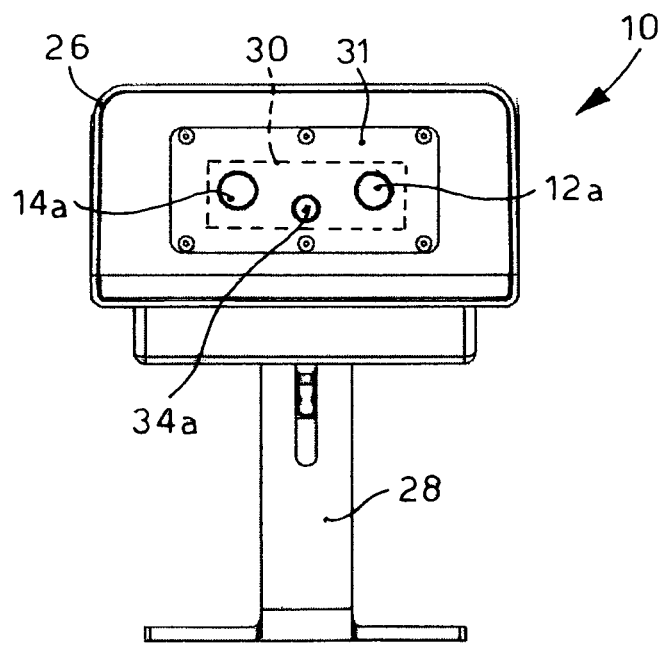
FIG. 2 is a front view of the measuring device in FIG. 1.

FIGS. 1 and 2 show a measuring device 10 for measuring the speed of oblong rolled products 15, for example a bar 15, moving along a hot rolling line. However, it should be remembered that the reference number 15 should not be understood as restrictive for the type of oblong product whose speed is to be measured. Indeed, the same measuring device 10 can be used, with the same purposes, for other oblong products moving and emitting radiations, advantageously infrared, without departing from the field of the present invention.

The measuring device 10 comprises optical units 13 (FIGS. 6, 7, 8, 9, 10, 11, 12a, 12b, 12c) associated with sensors, in this case two 12 and 14 (FIG. 11), which provide photodiodes, in this case sensitive to infrared wavelengths.

In some forms of embodiment, each optical unit 13 comprises a containing body 35, for example cylindrical, (FIGS. 11, 12a, 12b, 12c) inside which one of the sensors 12, 14 is housed, and a suitable lens 44 (FIGS. 9, 10, 11, 12b, 12c) which focuses the emission on the respective sensor 12, 14 behind, along respective optical axes X, X'. The optical path of the radiation emitted by the bar 15, therefore, provides the passage into the body 35 through the lens 44 and the subsequent focusing on the sensor 12, 14.

Figure 6:
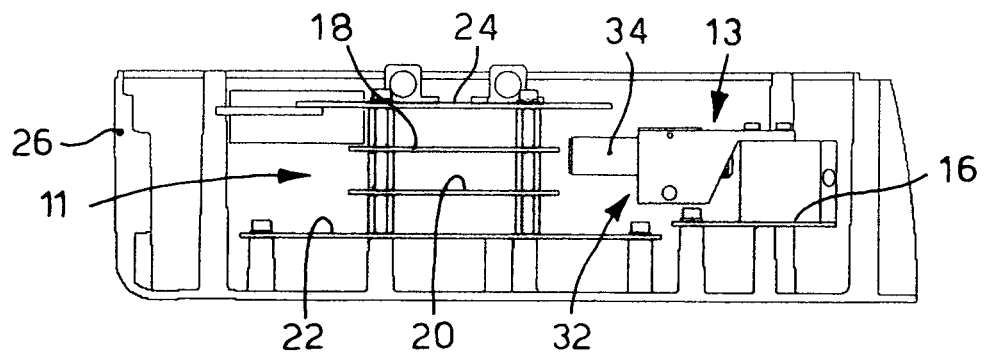
FIG. 6 is a schematic lateral representation of part of the device in FIG. 1.
Figure 7:
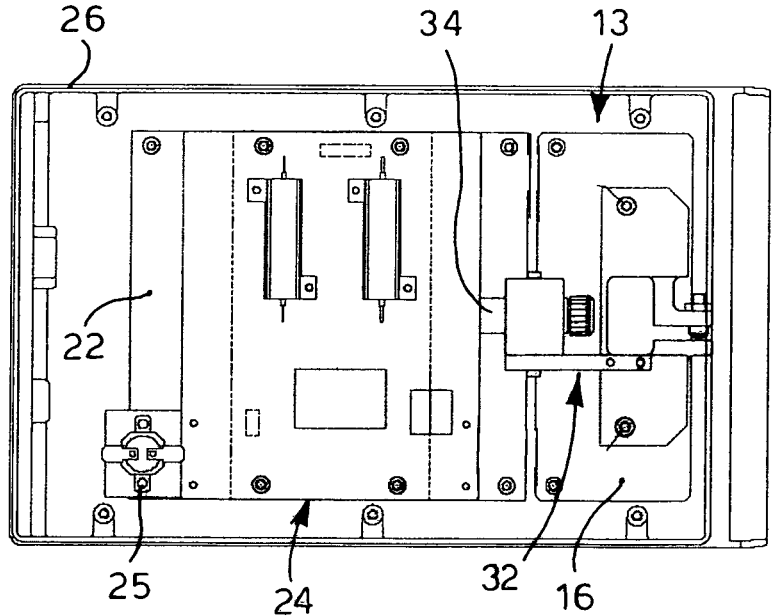
FIG. 7 is a schematic plane representation of part of the device in FIG. 1.
Figure 8:
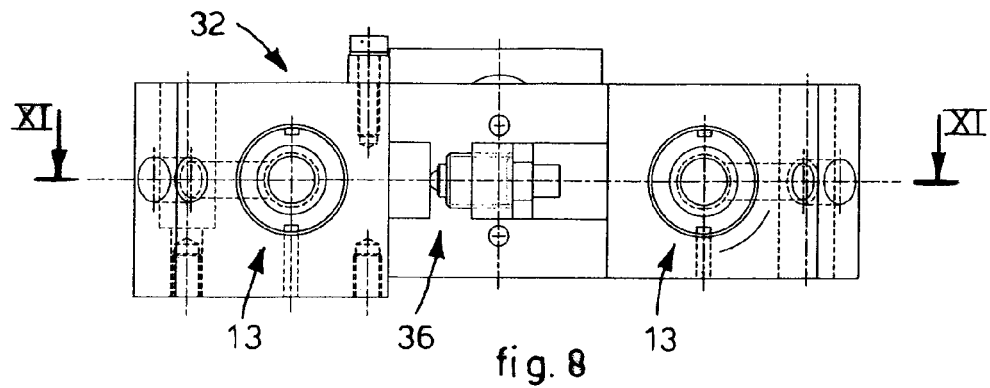
FIG. 8 is a front view of part of the device in FIG. 1.
Figure 9:
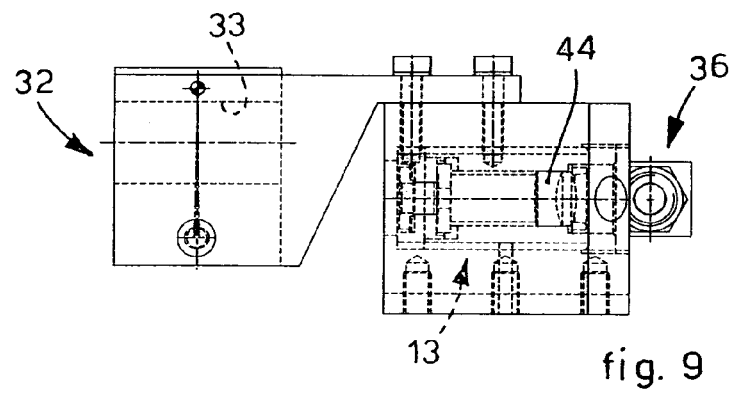
FIG. 9 is a lateral view of the part in FIG. 8.
Figure 10:
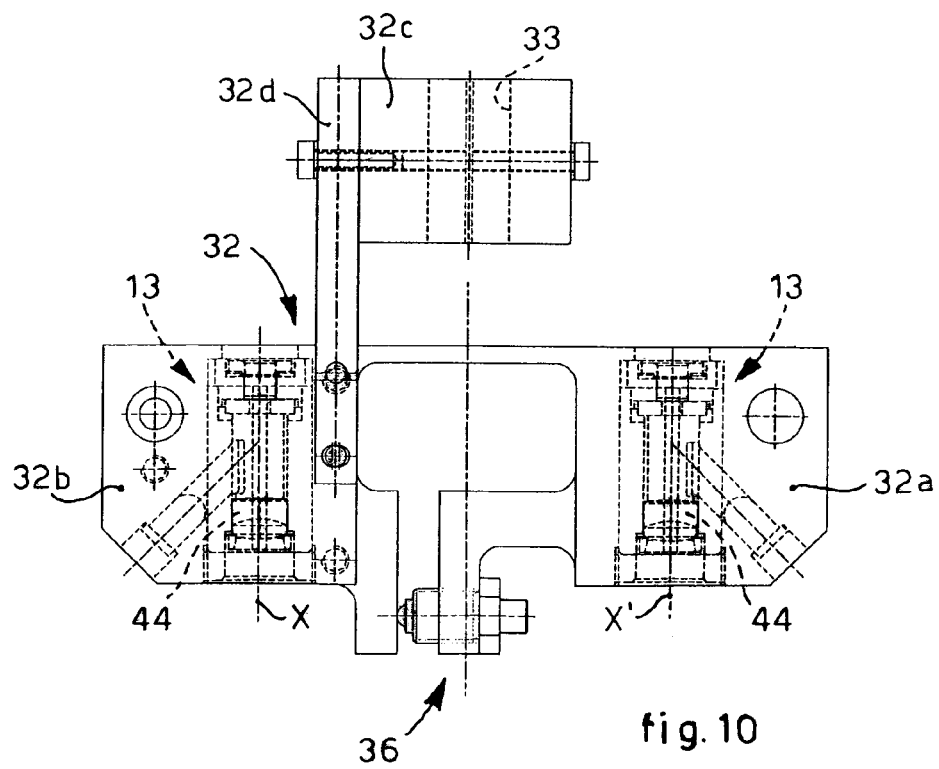
FIG. 10 is a plane view from above of the part in FIG. 8.

The optical units 13, in the form of embodiment shown here, are housed in turn inside a container 26, made of aluminum or other suitable material (FIGS. 6 and 7).

Figure 3:
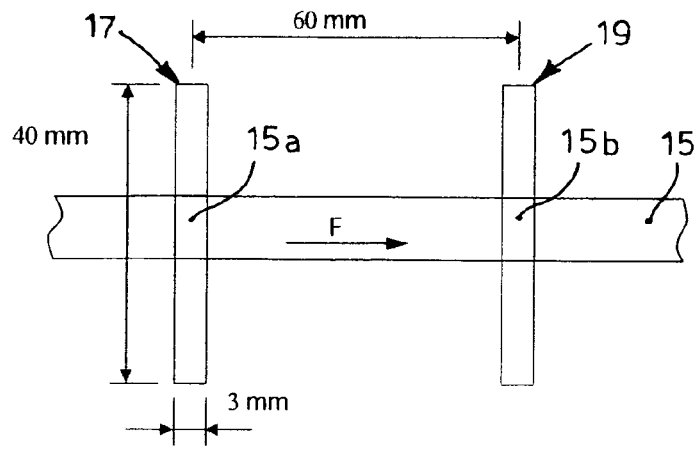
FIG. 3 is a schematic representation of the rectangular observation optical windows defined by the measuring device of the present invention.

Each of the sensors 12, 14 comprises, as we said, a photodiode sensitive to infrared (FIG. 12c shows in detail only the optical unit 13 that contains the first sensor 12, however the representation also applies to the optical unit 13 that contains the second sensor 14) and defines respective optical windows 17, 19 (FIG. 3), with an oblong shape and longitudinal development transverse to a direction of feed of the bar 15, as indicated by the arrow F in FIG. 3.

The windows 17, 19 are defined to observe, in two consecutive zones, a portion of bar 15 which on each occasion is presented and becomes visible in the optical windows 17, 19 in the direction of feed F (FIG. 3). In FIG. 3 the reference numbers 15a and 15b indicate, as a schematic example, the portion of bar 15 that is presented first (15a) in the optical window 17 and subsequently (15b) in the optical window 19.

The sensors 12, 14 observe the bar 15 or other rolled metal product through the optical windows 17, 19, in order to measure the speed thereof. In particular, the sensors 12, 14 that detect the infrared radiation are disposed at a close and known distance from each other and transmit correlated analogical electric signals which are subsequently processed in order to determine the speed.

In this case, the optical windows 17, 19, and therefore the two zones observed by the two infrared sensors 12, 14 are rectangular (3 mm base or width and 40 mm height or length) and 60 mm from each other (FIG. 3).

The oblong rectangular shape is advantageous because it makes the measurement independent from the vibrations of the bar 15 transverse to the direction of feed, in particular along the height, if the device 10 is disposed lateral to the line of feed and work, or along the depth, if installed above the line of feed and work. Moreover, the oblong shape allows to analyze a greater harmonic content of the signal, emphasizing the differences in the horizontal direction of feed between the successive portions of bar 15.

Figure 4:
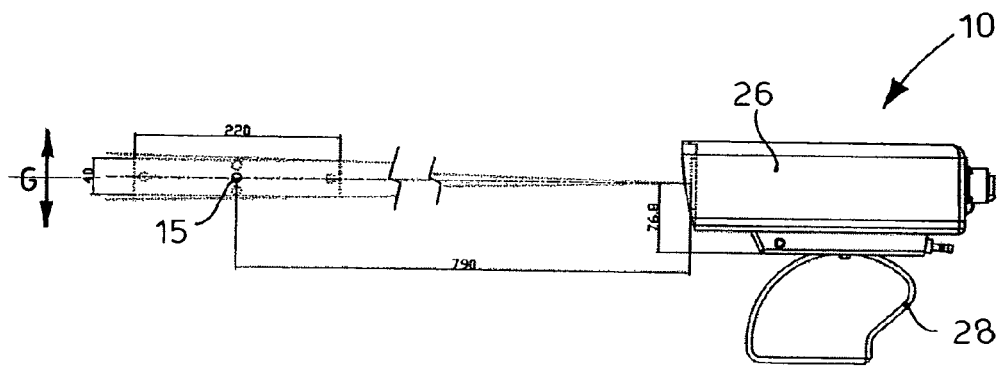
FIG. 4 is a lateral view of the reading range of the measuring device according to the present invention.
Figure 5:
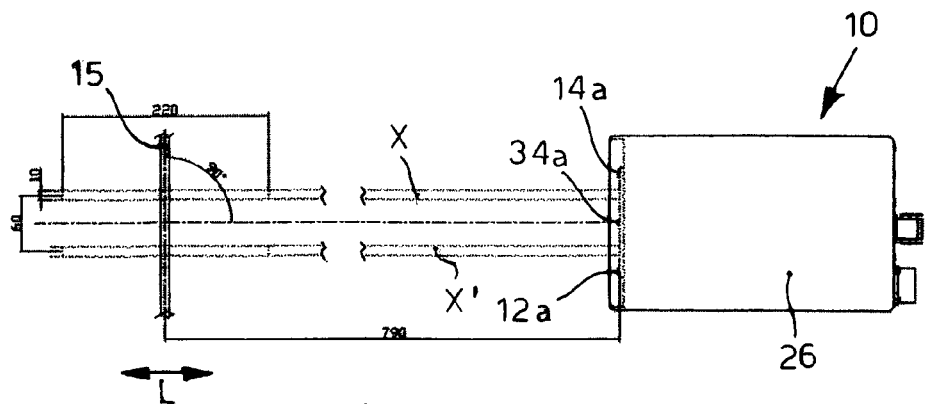
FIG. 5 is a plane view from above of the reading range in FIG. 4.

FIGS. 4 and 5 indicate schematically the possible directions of the transverse vibration of the bar 15, or other moving product, with the arrow G (movement in height in FIG. 4) and the arrow L (movement in depth in FIG. 5) with respect to the device 10, in this case located lateral, although this schematization of the directions of vibration of the bar 15 can also be adapted to the case where the device 10 is located above the rolling line.

The surface irregularities present on a microscopic level on the moving material cause variations in the light emission detected by the sensors 12, 14, which can be considered as a univocal reference in the comparison between the signals acquired by the sensors 12, 14 in the two observation zones identified respectively by the windows 17, 19.

With reference to FIGS. 3 and 5, if the bar 15 moves in the direction of feed F, the emission detected by the right hand sensor 14 has a development similar to the development of the emission detected by the left hand sensor 12, after a delay that depends on the speed of movement of the bar 15.

Knowing the distance between the observation fields of the two sensors 12, 14 and having as a reference a selected surface irregularity or dis-uniformity identified by using sophisticated mathematical algorithms based on the correlation principle, it is possible to calculate the delay associated with the same univocal reference as it appears to the detection in the two consecutive observation zones and to calculate with precision the speed of the bar 15.

Advantageously, the optical units or systems 13 as above have optical axes X, X' parallel to each other, associated or in cooperation with each of the sensors 12, 14 for infrared, in order to focus the radiation emitted by the portion of bar 15 in transit along the associated optical window 17, 19 onto the relative sensor 12, 14.

FIG. 5 shows the parallelism of the optical axes X, X' of the two observation channels defined by the two sensors 12, 14. This has the advantageous technical effect of rendering the distance between the portions 15a, 15b of bar 15 observed by the optical windows substantially independent of the distance between the measuring device 10 and the bar 15.

In one form of embodiment, each optical unit 13 is able in particular to define the windows 17, 19 by means of a diaphragm 38 (FIGS. 12b, 12c, 12d) in this case of the discoid type, advantageously made of laser cut steel, disposed inside the containing body 35 along the optical path of the radiation emitted by the bar 15, between the lens 44 and the sensor 12, 14.

In the solution shown in the drawings, between the lens 44 and the diaphragm 38 there is a ring nut 37 that keeps the diaphragm 38 in position and that has an aperture 39 for the radiation to pass.

The diaphragm 38 has a micrometric slit 40 with an elongated shape, in this case rectangular, for example 3 mm long and 0.075 mm wide, correlated to the desired geometric shape of the window 17, 19.

Due to the slit 40 in the diaphragm 38, located in front of the photodiode of the sensor 12, 14 to act as a mask, the desired geometric area is defined to measure the speed, and it is possible to observe through the lens 44 only what is included in an image plane with the desired elongated rectangular shape.

Instead of using the diaphragm 38 as above as a mask, it could be the sensitive element itself, which constitutes each sensor 12, 14, that is shaped with an elongated shape, like a rectangle, to define the desired optical window.

To obtain good measuring reliability, the measuring device 10 should preferably be located at a suitable distance from the bar 15 and be correctly trained.

According to the invention, moreover, the observation range of the measuring device 10 must cover all the positions in which the bar 15 may find itself.

For example, in some forms of embodiment (FIGS. 4 and 5), to be understood as examples and in no way restrictive of the field of the present invention, with particular reference to the heights and distances indicated:
- the center of the reading range defined by the windows 17, 19 of the measuring device 10 is located at 790 mm from the front part of the device 10. Therefore, the measuring device 10 must in this case be located at the same distance from the material whose speed is to be measured. The reading range defined by the windows 17, 19 in this case has a depth of ±110 mm with respect to the center. It is therefore preferable that the bar 15 does not come closer to or move farther from the measuring device 10 above said value, starting from the distance of 790 mm;
- the reading range defined by the windows 17, 19 has a height of ±20 mm. It must therefore be guaranteed that the bar 15 does not exceed these limits;
- the bar 15 must be visible for a segment at least 100 mm long (or alternatively for 2 segments of 10-20 mm, 60 mm distant from each other, see FIGS. 4 and 5), so that both sensors 12, 14 can observe it correctly;
- the training direction of the measuring device 10 must be as orthogonal as possible, preferably within ±3°, to the direction of feed F of the bar 15. As mentioned above, the orientation of the measuring device 10 for training is guided by an emitter 34 of coherent light, such as laser, and is allowed by the support 28, which is suitably shaped and provides curvilinear eyelets and hinges that allow it to be moved angularly.

In some forms of embodiment, an incandescent lamp, for example an electric torch, positioned in the zone where the moving bar 15 will pass and trained toward the front part of the measuring device 10, allows to effect a further verification of the training.

The container 26 has a rectangular aperture or optical window 30 at the front (FIG. 2), the sizes of which are sufficiently big to allow the operations of the sensors 12, 14 and the emitter 34. The aperture 30 is associated with a glass panel, which is protected by a protection panel 31, for example made of shaped metal sheet. The protection panel 31 has two apertures 12a, 14a through which the two sensors 12, 14 which define the optical windows 17, 19 can observe the moving bar 15. Moreover, the protection panel 31 also has an aperture 34a, in this case in a central position, to allow the beam of laser light arriving from the emitter 34 to pass.

The container 26 is supported by a support 28 which facilitates the attachment and angular orientation thereof, both around a vertical axis and also pivoting horizontally around a horizontal pivoting axis.

As can be seen in FIGS. 6 and 7, inside the container 26 the measuring device 10 comprises a signal processing unit 11, of the electronic type, which comprises four electronic cards, in particular a first card 16, a second card 18, a third card 20 and a fourth card 22.

A heating module 24 and possibly a cooling circuit, not shown in the drawings, are also disposed in the container 26.

Furthermore, in some forms of embodiment, the container 26 also houses the emitter 34 that facilitates the training of the measuring device 10.

With reference to the processing unit 11, the first card 16 is able to amplify and condition the signals of the two sensors 12, 14.

Moreover, the first card 16 supports a mechanical block 32 (FIGS. 6, 7, 8, 9, 10, 11) which supports the optical units 13 of the infrared detector photodiodes which make up the sensors 12, 14; the emitter 34 is also mounted on the block 32 in this case, in a suitable housing 33.

The block 32, in the embodiment shown, consists of three portions 32a, 32b, 32c. In particular, a first portion 32a and a second portion 32b support the optical units 13 with the relative sensors 12 and 14, while a third portion 32c, connected to the second portion 32b by means of a wall 32d, provides the housing 33 that supports the emitter 34.

The block 32 comprises micrometric screw-type adjustment means 36, by means of which, thanks also to the elastic material, advantageously elastic steel, of which it consists, it is possible to adjust the reciprocal inclination of the first portion 32a and the second portion 32b, and therefore the relative angle between the optical axes X and X' of the two optical units 13, so that they are parallel as described above.

The second card 18 generates all the feed tensions, opto-isolated or not, to feed the whole measuring device 10.

The third card 20 is able to read the reference speed deriving from the current signal arriving from outside, when present.

The fourth card 22 manages and executes, by means of a DSP (Digital Signal Processor), all the numerical processings in order to transform the analogical electric signals arriving from the sensors 12, 14 into digital signals and to calculate the correlation thereof; it also manages the inputs and outputs, both analogical and digital.

The heating module 24 consists of a power resistor and a control thermostat 25, for example of the bi-metallic type. In a possible form of embodiment, the intervention thresholds of the heating module 24 are as follows:
- temperature inside the device 10 below 10±4° C. means the heating module 24 is active in heating;
- temperature above 20±3° C. means heating off.

The acquisition frequencies used by the sensors 12, 14 to sample and digitalize the signals due to the emission of the bar 15, arriving from the sensors 12, 14, are all generated by the clock of the DSP core (200 MHz) of the fourth card.

These frequencies were calculated so as to be able to acquire the signals of bars at different speeds and to have maximum measuring precision. The speed calculation is performed by making the correlation between the AC components of the signals acquired by the two sensors 12 14 based on the distance between the optical windows 17, 19 and the delay between the signals acquired by the two sensors 12 and 14.

Figure 13:
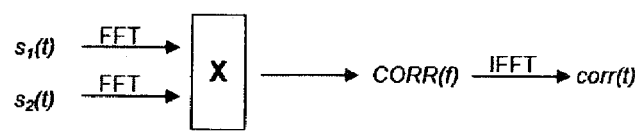
FIG. 13 is a block diagram of the calculation of the correlation of the signals acquired by the two detection channels of the measuring device according to the present invention.

Given the complexity of the calculation of the correlation in the time domain, the correlation is made by passing through the frequencies domain according to the block diagram shown in FIG. 13, based on the application of a Fast Fourier Transform (FFT) and an inverse Fast Fourier Transform (IFFT), where $s_1(t)$ and $s_2(t)$ are the time functions of the signals arriving from the two sensors 12, 14, CORR(f) is the correlation function in the frequencies domain and corr(t) is the correlation function in the time domain.

Figure 14:
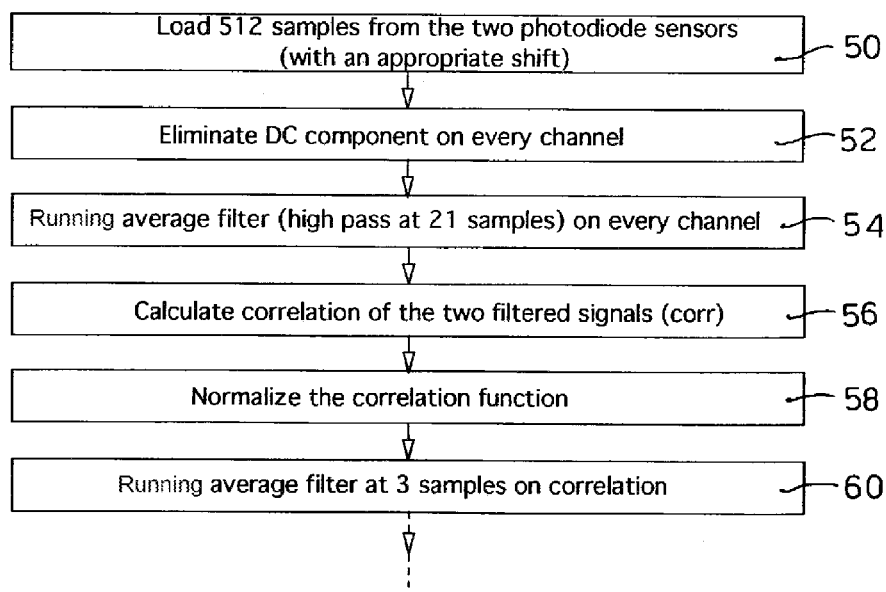
FIG. 14 is a first part of a block diagram that describes the algorithm for measuring the speed according to the method of the present invention.
Figure 15:
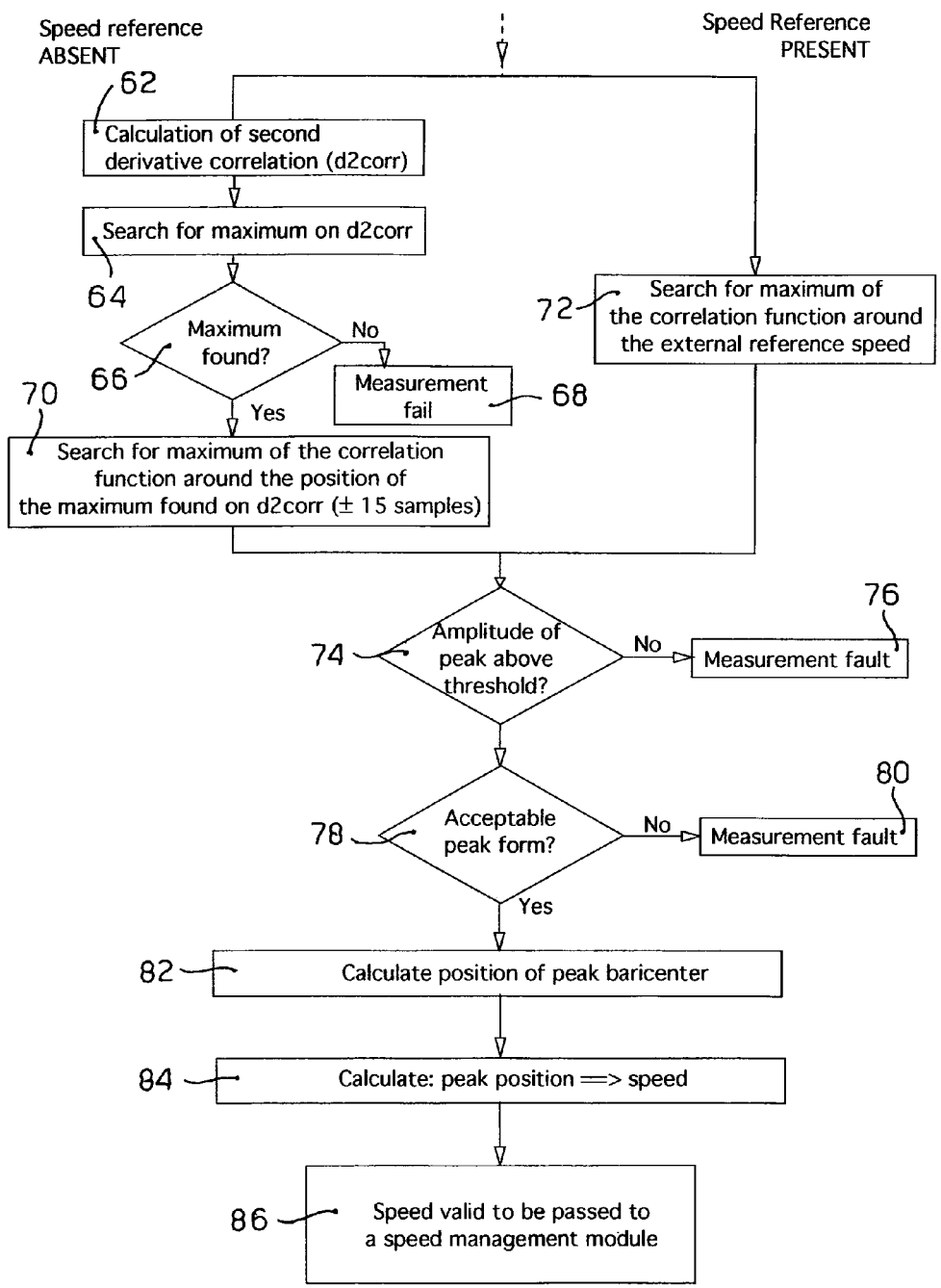
FIG. 15 is the second and last part of the block diagram that describes the measuring algorithm in FIG. 14.

The complete block diagram of the speed calculation algorithm based on correlation is shown in FIGS. 14 and 15. As can be seen, it changes according to the presence or absence of the signal of external reference speed.

The availability of an external signal corresponding to the reference speed initially set for the bar or rolled product, that is, a speed near the expected speed of the bar or rolled product to be measured, is particularly useful when measuring ribbed rolled products.

With rolled products like this, in fact, due to the presence of the equidistant surface ribs, the mathematical algorithm that performs the correlation calculation produces not one but a plurality of maximum correlation values, regularly spaced from each other in correlation to the distance between the ribs, only one of which corresponds to the real speed of the bar or rolled product.

Because the reference speed signal is known, it is possible to identify, among the various peaks present, the only one corresponding to the real speed, which will be the one relating to the value nearest to the reference speed.

In substance, the measuring method according to the invention, detailed in the algorithm shown in FIGS. 14 and 15, provides:

to load a plurality of consecutive values of signal samples, in this case 512, arriving from the sensors 12, 14, with an appropriate time shift or delay (block 50);
to eliminate the DC component on every channel of the signals of the two sensors 12, 14 (block 52);
to perform a running average filtering with, in this case, high pass at 21 samples, of every channel (block 54);
to calculate the correlation of the two filtered signals, that is, on the remaining AC component of the two channels (block 56), in order to identify a univocal reference between the two observation zones, following the calculation in FIG. 13;
to normalize the correlation function (block 58);
to perform a running average filtering with, in this case at 3 samples, on the correlation function (block 60);

Afterwards, if the speed reference is absent, the second derivative of the correlation function is calculated (block 62), the maximum of the second derivative is searched for (block 64) and verification is made of whether the maximum is found (block 66).

If the maximum is not found, the measurement has failed (block 68); otherwise, if it is found, the search for maximum is repeated around the value found, this time operating directly on the correlation function and not on the second derivative (block 70).

On the contrary, if there is a speed reference present, search is made for the maximum of the correlation function around the external reference speed (block 72).

In both cases, when the maximum is found, verification is made of whether the amplitude of the peak is above the threshold (block 74).

If negative, the measurement has failed (block 76), and if positive, verification is made of whether the form of the peak is acceptable (block 78).

Here too, if negative, the measurement has failed (block 80), whereas if positive the position of the baricenter of the peak is calculated (block 82), and a conversion is made from the peak position to the value of speed of the rolled product (block 84), which will be a function of the known distance between the observation zones of the sensors 12, 14 and the time delay of the univocal reference identified in the two series of consecutive signal samples acquired by the two sensors.

Finally, the valid speed value calculated in block 84 is passed (block 86) to a speed management module, implemented in the fourth card 22.

The speed management module consists of two macro blocks, that is:

i) a status machine consisting of the following statuses:
the measurement is over-correlation;
there have been too many under-correlations and therefore a request procedure for self-setting is launched;
the system is waiting for the buffer memory to be filled following the change in acquisition frequency or gain of the amplifiers;
the buffers have finished filling;
the speed measurement is under-correlation;
waiting for valid speed from correlation following the measurement of the speeds of the leading end of the bar;
request to change gain;
and
ii) a module to determine the speed to be supplied at exit.

This last module is initialized when the bar enters with a speed value that can be the speed of the leading end of the bar, the external reference speed, if present, or the correlation speed if it is stable.

The quality of the speed detected is evaluated by measuring the amplitude of the peak of the normalized correlation.

If the amplitude of the peak is greater than or equal to about 0.25, the measurement is good (over-correlation), otherwise it is not good (under-correlation).

At every cycle, through an optimum Kalman predictor, with one step and three parameters, the measurement algorithm uses the speed supplied at exit (from the previous cycle) in order to calculate the estimate of the future value.

This value will be used to accept the measurement of over-correlation speed.

To be more exact, the over-correlation speed at the $i$-$^{th}$ instant must not differ beyond a certain value (for example 7% of the value at which the management module of the exit speed is initialized) from the speed estimated in the previous step.

If this condition is satisfied, the over-correlation speed will be supplied at exit, otherwise the value estimated by the predictor at the previous step is supplied.

If there are n consecutive measurements that do not satisfy the above condition, the value estimated by the predictor at the previous step will always be supplied.

The Kalman predictor also begins to function in conditions of unstable signals and under-correlation measurement.

Therefore, the conditions in which the estimated speed will be supplied at exit, and not the speed measured, are as follows:
over-correlation speed that does not satisfy the above condition for which, at the $i$-$^{th}$ instant, it will not have to differ beyond a certain value from the speed estimated at the previous step;
a bar has just entered: the system is waiting for the signal arriving from the sensors 12, 14 to be loaded (AC component);
the speed measurement is under-correlation;
change of gain and change of acquisition frequency.

As the whole bar 15 advances, a statistical analysis is made on the results provided by the correlation calculation. To be more exact, at the end of each processing cycle, it is possible to have the following statuses: over-correlation measurement valid, over-correlation measurement but discarded by the predictor filter and under-correlation measurement.

The analysis is repeated with a period of 2 seconds, with a frequency of 1 measurement every millisecond, therefore every 2000 measurements. During this interval the three statuses listed above are counted, in this way obtaining three overall values, from which the predominant status is identified, which can be: the system is measuring and functioning correctly, the Kalman predictor must be initialized, the system is unable to identify any correlation and therefore a complete automatic setting of the system is carried out.

It is clear that modifications and/or additions of parts and/or steps may be made to the measuring device 10 and relative method as described heretofore, without departing from the field and scope of the present invention. It is also clear that, although the present invention has been described with reference to some specific examples, a person of skill in the art shall certainly be able to achieve many other equivalent forms of measuring device and relative method, having the characteristics as set forth in the claims and hence all coming within the field of protection defined thereby.

The invention claimed is:

1. A device for measuring speed of moving oblong products in movement along a determinate direction of feed (F) and emitting radiations, comprising:
   at least two sensors for radiations, suitable to detect overall energy emitted by the moving oblong product, disposed reciprocally at a close distance and each able to define a respective optical observation window, disposed at a known and pre-arranged distance from each other, each window configured to always cover an image of a determinate portion of advancing said product equal to a width of the relative window, irrespective of the movements made by said portion transversely to the direction of feed, each of said windows having an oblong rectangular shape,
      with a bigger side, or length, transverse to, and width parallel to, the direction of feed (F) of the oblong product to be measured, wherein a ratio between length and width of each window is between 3:1 and 20:1,
      wherein each window has the bigger side, or length, oriented in a direction orthogonal to the direction of feed (F) of the moving oblong product and of a size much larger than a transverse size of the moving oblong product, wherein a ratio between the length of each window and the transverse size of the moving oblong product is between 12:1 and 3:1;
   said sensors for observing said portion of product presented, on each occasion, in correspondence with the associated windows consecutively along the direction of feed (F), said sensors also for continuously measuring intensity of the radiation associated with the overall energy emitted by the moving product and emitted by the portion of product in correspondence with the windows;
   an electronic processing unit able to determine, by processing electric signals associated with the intensity of radiation detected and arriving from the two sensors, using mathematical algorithms based on correlation principle, time taken by the portion of product to transit from a first window to a second, successive window, and then, on the distance between said two windows, to calculate the speed of the oblong product.

2. The device as in claim 1, further comprising an optical unit, associated or in cooperation with each of said sensors for radiations, able to focus the radiation emitted by the portion of product in transit along the associated window on the relative sensor, said optical units having optical axes (X, X') parallel to each other.

3. The device as in claim 2, wherein each optical unit comprises a diaphragm which has a slit to define said windows.

4. The device as in claim 1, wherein each sensor comprises a shaped photosensitive element with an elongated shape, to define the desired optical window.

5. The device as in claim 1, comprising an emitter of coherent light which projects a thin luminous line on the ideal sliding axis of the product, to facilitate the correct aiming of the sensors on the product whose speed is to be measured.

6. The device as in claim 1, comprising a container in which the sensors are housed, which is supported by a support to allow the attachment thereof and to facilitate the orientation thereof both on the horizontal plane and also on the vertical plane.

7. The device as in claim 6, wherein said container (26) is provided with an incorporated circuit for fluid cooling.

8. The device as in claim 6, wherein said container (26) comprises a heating module.

9. The device as in claim 6, wherein said container provides one or more optical apertures or windows, through which the sensors can observe the product in movement.

10. The device as in claim 1, wherein the oblong products in movement along a determinate direction of feed (F) and emitting radiations are rolled metal products in a rolling line.

11. The device as in claim 1, wherein the ratio between length and width of each window is between 5:1 and 15:1.

12. The device as in claim 1, wherein the ratio between the length of each window and the transverse size of the product is comprised between 10:1 and 6:1.

13. The device as in claim 1, wherein the electronic processing unit is adapted and configured for:
   loading a plurality of consecutive values of signal samples arriving from the sensors, with an appropriate time shift or delay;
   eliminating the DC component on every channel of the signals of the sensors;
   performing a running average filtering of every channel;
   calculating the correlation of the two filtered signals, on the remaining AC component of the two channels, to identify a univocal reference between the two observation zones, by calculating the correlation function CORR(f) in the frequencies domain based on the application of a Fast Fourier Transform (FFT) and an inverse Fast Fourier Transform (IFFT);
   normalizing the correlation function;
   performing a running average filter on the correlation function; and having the following provisos
   (1) if a reference speed value initially set for the moving product, that is, a speed near the speed expected for the moving product, is absent, the method calculates the second derivative of the correlation function, to search for the maximum of the second derivative function and to verify if the maximum is found, and if the maximum is found, the search for the maximum is repeated around the value found, operating directly on the correlation function, and not on the second derivative;
   (2) if a reference speed value is present, a maximum of the correlation function is searched for, around the external reference speed;

in both provisos, when the maximum is found, verification is made of whether the amplitude of the peak is above the threshold and if positive, verification is made of whether the form of the peak is acceptable and if positive the position of the baricenter of the peak is calculated and a conversion calculation is made from the peak position to the value of speed of the product, which is a function of the known distance between the observation zones of the sensors and the time delay of the univocal reference identified in the two series of consecutive signal samples acquired by the two sensors.

14. The device as in claim 13, wherein the oblong products in movement along a determinate direction of feed (F) and emitting radiations are rolled metal products in a rolling line.

15. A method for measuring speed of oblong products in movement along a determinate direction of feed (F) and emitting radiations, comprising:

defining, using radiation sensors to detect overall energy emitted by the product as the product moves, at least two optical observation windows, disposed at a known distance from each other, configured to always cover an image of a determinate portion of advancing moving oblong product of a size equal to a width of the window, irrespective of the possible movements made by said portion transversely to the direction of feed (F), each of said windows having an oblong rectangular shape, with a bigger side, or length, transverse to, and width parallel to, the direction of feed (F) of the oblong product to be measured, wherein a ratio between length and width of each window is between 3:1 and 20:1, wherein each window has the bigger side, or length, oriented in a direction orthogonal to the direction of feed (F) of the product and of a size much larger than a transverse size of the product, wherein the ratio between the length of each window and the transverse size of the product is between 12:1 and 3:1;

observing the determinate portion of product presented, on each occasion, in correspondence with associated windows, consecutively along the direction of feed (F);

employing the radiation sensors for continuously measuring intensity of the radiation associated with overall energy emitted by the product in movement in correspondence with the relative windows;

employing an electronic processing unit to process the electric signals associated with the radiation measured, using mathematical algorithms based on a correlation principle, to determine time taken by the portion of product to transit from a first window to a second, successive window, and then, based on the distance between said two windows, to calculate the speed of the advancing product.

16. The method as in claim 15, comprising using the irregularities or dis-uniformities present on the surface of the product as a reference to evaluate, by means of said mathematical algorithms based on the correlation principle, the delay between the signals detected and to determine the speed of the product.

17. The method as in claim 15, comprising:

loading a plurality of consecutive values of signal samples arriving from the sensors, with an appropriate time shift or delay;

eliminating the DC component on every channel of the signals of the sensors;

performing a running average filtering of every channel;

calculating the correlation of the two filtered signals, on the remaining AC component of the two channels, to identify a univocal reference between the two observation zones, by calculating the correlation function CORR(f) in the frequencies domain based on the application of a Fast Fourier Transform (FFT) and an inverse Fast Fourier Transform (IFFT);

normalizing the correlation function;

performing a running average filter on the correlation function; and having the following provisos (1) if a reference speed value initially set for the moving product, that is, a speed near the speed expected for the moving product, is absent, the method calculates the second derivative of the correlation function, to search for the maximum of the second derivative function and to verify if the maximum is found, and if the maximum is found, the search for the maximum is repeated around the value found, operating directly on the correlation function, and not on the second derivative;

(2) if a reference speed value is present, a maximum of the correlation function is searched for, around the external reference speed;

in both provisos, when the maximum is found, verification is made of whether the amplitude of the peak is above the threshold and if positive, verification is made of whether the form of the peak is acceptable and if positive the position of the baricenter of the peak is calculated and a conversion calculation is made from the peak position to the value of speed of the product, which is a function of the known distance between the observation zones of the sensors and the time delay of the univocal reference identified in the two series of consecutive signal samples acquired by the two sensors.

18. The method as in claim 17, the calculated speed value is managed by a speed management module consisting of first and second macro blocks:

i) the first macro block is a status machine consisting of the following statuses:

the measurement is over-correlation;

there have been too many under-correlations and therefore a request procedure for self-setting is launched;

the system is waiting for the buffer memory to be filled following the change in acquisition frequency or gain of the amplifiers;

the buffers have finished filling;

measurement of under-correlation speed;

waiting for valid correlation speed following the measurement of the speeds of the leading end of the bar;

request to change gain;

and ii) the second macro block is a module that determines the speed to be supplied at exit, which is initialized when the moving product enters with a speed value that can be the speed of the leading end of the moving product, the external reference speed, if present, or the correlation speed if it is stable;

wherein the quality of the speed detected is evaluated by measuring the amplitude of the peak of the normalized correlation and if the amplitude of the peak is greater than or equal to about 0.25, the measurement is good and there is over-correlation, otherwise it is not good and there is under-correlation, and at every cycle, through an optimum Kalman predictor, with one step and three parameters, the measurement algorithm uses the speed supplied at exit from the previous cycle to calculate the estimate of the future value and this value will be used to accept the measurement of over-correlation speed, wherein the over-correlation speed at the i-$^{th}$ instant must not differ beyond a certain value from the speed estimated in the previous step and if this condition is satisfied, the over-correlation speed will be supplied at exit, otherwise the value estimated by the predictor at the previous step is supplied, and if there are n consecutive measurements that do not satisfy the above condition, the value estimated by the predictor at the previous step will always be supplied.

19. The method as in claim 17, wherein the oblong products in movement along a determinate direction of feed (F) and emitting radiations are rolled metal products in a rolling line.

20. The method as in claim 15, wherein the oblong products in movement along a determinate direction of feed (F) and emitting radiations are rolled metal products in a rolling line.

* * * * *